Patented Dec. 19, 1944

2,365,400

UNITED STATES PATENT OFFICE 2,365,400

HEAT-STABILIZED HIGH-POLYMER HALOGEN-CONTAINING PRODUCTS

Hans Fikentscher, Ludwigshafen-on-the-Rhine, Germany; vested in the Alien Property Custodian No Drawing. Application April 19, 1941, Serial No. 389,417. In Germany January 2, 1940

3 Claims. (Cl. 260—88)

The present invention relates to halogen-containing high-polymeric substances of improved heat stability.

High-polymeric substances containing halogen have marked tendency to split off hydrogen halide on heating. The hydrogen halide so liberated not only causes discoloration of the substances but also attacks the metallic parts of the equipments in which the substances are worked, for example rollers or molds, and also metallic parts embedded in the finished molded articles made from the high-polymeric substances.

It has already been proposed to add lead compounds as heat stabilizing agents. The poisonous effect of the lead compounds and their tendency to undergo discoloration in the presence of even slight quantities of hydrogen sulphide, however, prejudices their use in practice.

It is further well known to use basic substances, as for example alkali metal salts of weak organic acids, carbonates or hydroxides of the alkali metals or alkaline earth metals or organic nitrogenous compounds having a weak basic action, as heat stabilizing agents. These substances, indeed, absorb and neutralize the hydrogen halide split off in the heat, but on the other hand, on account of their alkaline reaction favour the splitting off of hydrogen halide from many high-polymeric substances containing halogen in the heat, so that in these cases completely colorless shaped articles cannot be obtained. Ureas and thioureas, too, have been proposed as stabilizing agents, but when admixed alone, they do not prevent the high-polymeric halogen-containing substances from becoming brown in the heat.

I have now found that the heat stability of halogen-containing high-polymeric substances is considerably improved by adding to them alkaline substances and in addition thereto amines or carbamides bearing a hydrogen atom replaceable by an alkali metal, as a stabilizing agent.

As alkaline substances may be mentioned, for example, the alkali metal and alkaline earth metal hydroxides and carbonates and salts of weak acids, especially organic acids or of boric acid, also basic phosphates.

Suitable amines or carbamides bearing at least one hydrogen atom replaceable by an alkali metal are, for example, diarylamines, as diphenylamine, furthermore thiourea and, in particular, arylthioureas, for example phenyl-, diphenyl-, dichlordiphenyl-, ditolyl- and dinaphthylthioureas, furthermore arylureas and ureides.

Among high-polymeric halogen-containing substances which can be stabilized according to the present invention, may be mentioned, for example chlororubber, chlorinated butadiene rubber, polyvinyl chloride, chlorinated polyvinyl chloride, poly-as-dichlorethylene, polymeric chloracrylic compounds and interpolymerization products of the monmeric compounds forming the basis of the above polymerization products, either with one another or with other polymerizable substances. Also in the event of softeners being added to the polymerization products, the mixture of alkaline substances with the said amines or carbamides exerts its favorable stabilizing action.

The halogen-containing high-polymeric substances thus stabilized are quite resistant even when heated for a long time. While the alkaline substances will absorb and neutralize the hydrogen halide set free in the heat, their alkaline action appears to be lessened by the addition of an amine or carbamide of the said type.

The quantity of the alkaline substances and of the amines or carbamides may vary within rather wide limits. Generally speaking, additions of from 0.1 to 1 per cent. of an alkaline substance and of from 0.01 to 5 per cent. of an amine or carbamide of the said kind are most suitable. There is a definite rate and minimum of the stabilizing agents for each of the halogen-containing high-polymeric substances which brings about the best effect. This rate may easily be determined by experiment.

The stabilizing agents may be added in a dissolved, suspended or pulverulent state to the halogen-containing high-polymeric substances, which in their turn may be in a dissolved, dispersed or solid state. In practice, the stabilizing agents are advantageously incorporated with the halogen-containing high-polymeric substances as uniformly as possible distributed even before the substances are worked up in the heat, but they may also be added only when the substances are being worked in the heat, for example rolled or molded. The stabilizers may also be added during the preparation of the halogen-containing high-polymeric substances, for example during their polymerization.

On account of their improved heat stability the halogen-containing high-polymeric substances made in accordance with the present invention can be heat-molded forming completely colorless articles, whereas the shaped articles hitherto obtained in the heat were more or less discolored.

The following examples serve to illustrate how the present invention may be carried out in practice but the invention is not restricted to the said examples. The parts are given by weight.

Example 1

Several batches of highly polymeric vinyl-chloride obtained by emulsion-polymerization are washed after precipitation from the emulsion with sodium carbonate solutions of various concentrations so as to incorporate each batch of the polymerization product with a definite percentage of sodium carbonate, as illustrated in the table below. The dried polymerization product is then admixed with about 1 per cent of a wax as lubricant and with varying amounts of diphenylthiourea in a ball-mill. The samples withdrawn are rolled at 165° C. for 15 minutes and finally stretched into sheets of 0.1 millimeter thickness. These sheets are then kept in a heat cabinet at 155° C. for 2 hours. The discoloration of the sheets caused by this treatment is a measure of their heat-resisting quality. The sheets are inspected in an eightfold layer to better show the degree of discoloration.

The effect of the different percentages of the stabilizing agents on the heat-resistance of the sheets will be seen from the data in the following table. This table in its columns $d$ and $e$ refers to ordinal numbers 1 to 9, which denote the depth of color as in the following list:

1 = Completely colorless
2 = Discoloration just visible
3 = Faintly light brown to light yellow
4 = Light brown
5 = Brown
6 = Strong brown
7 = Next to dark brown
8 = Dark brown
9 = Very dark brown.

In the table "clear" means that the sheets are distinguished by a striking clarity far superior to that of the other sheets.

| a | b | c | d | e |
|---|---|---|---|---|
| Batch | Additions in per cent of— | | Discoloration of the sheets after— | |
| | Sodium carbonate | Diphenyl thiourea | Rolling at 165° C. for 15 min. | Storage for 2 hours (at 155° C.) |
| 1 | Less than: 0.03% | 0 | 3–4 | 7 |
| 2 | 0.03% | 0.03 | 3–4 | 7–8 |
| 3 | 0.03% | 1.0 | 4 | 7–8 |
| 4 | 0.08% | 0.006 | 2 | 6–7 |
| 5 | 0.08% | 0.01 | 1 | 6–7 |
| 6 | 0.08% | 0.03 | [1]1 | 6 |
| 7 | 0.08% | 0.15 | [1]1 | 7 |
| 8 | 0.08% | 1.0 | 1 | 8 |
| 9 | 0.2% | 0 | 3 | 6 |
| 10 | 0.2% | 0.03 | 1–2 | 4 |
| 11 | 0.2% | 0.15 | [1]1 | 2 |
| 12 | 0.2% | 1.0 | 1 | 2 |
| 13 | 0.4% | 0 | 3–4 | 5 |
| 14 | 0.4% | 0.03 | 1–2 | 5–6 |
| 15 | 0.4% | 0.15 | [1]1 | 3–4 |
| 16 | 0.4% | 1.0 | 1 | [2]1–2 |
| 17 | 0.4% | 3.0 | 1–2 | [2]2 |
| 18 | 0.4% | 5.0 | 1–2 | [2]2–3 |

[1] Clear.
[2] Yellowish.

As will be seen from the table the data given are for one addition alone and for two additions jointly. Where both substances are added their effect is not a mere aggregation of the individual effects, but the stabilizing effect of the sodium carbonate is considerably increased. Thus, for example, in batch No. 5 by the use of 0.08 per cent of sodium carbonate with an addition of 0.01 per cent of diphenylthiourea a far better effect is reached than in batch No. 3 where a hundred times larger amount of diphenylthiourea was used together with 0.03 per cent only of sodium carbonate. The table further shows that for every percentage of sodium carbonate the maximum effect and the best clarity is produced by a definite percentage of diphenylthiourea and that a larger addition will result in a distinct deterioration of the heat stability. Thus, for example, according to batch No. 6 the use of 0.08 per cent of sodium carbonate yields the best effect with an addition of 0.03 per cent of diphenylthiourea which effect, as may be seen from batch No. 8, is diminished when adding 1 per cent of diphenylthiourea.

From the samples made up with 0.4 per cent of sodium carbonate (batches Nos. 13–18), No. 16 and 17 containing 1 and 3 per cent, respectively, of diphenylthiourea are apparently best in quality. The masses according to No. 16 which are practically not discolored even after a two hours' storage at 155° C., are especially suitable for making colorless molded articles which either during or after their manufacture are exposed to severe heating conditions.

The diphenylthiourea may be added in a pulverulent state or in solution, using methanol, for example, as a solvent, or in aqueous suspension. Thus, for example, the polyvinylchloride precipitated from the aqueous dispersion formed by the emulsion polymerization may be washed with a sodium carbonate solution saturated with diphenylthiourea. In this case, too, a colorless sheet is obtained after rolling at 165° C. for more than 15 minutes. This latter method ensures a specially uniform distribution of the stabilizing agents, one or two passages through the roller being thus sufficient to obtain a beautiful and uniform sheet. Other arylated thioureas, as for example dinaphthyl-, ditolyl-, dichlordiphenyl- as well as phenylthiourea act similarly to diphenylthiourea. Phenylthiourea is readily soluble in water and therefore especially suitable for being added in an aqueous solution.

Similarly good results are obtained with interpolymerization products from vinylchloride and maleic esters or acrylic esters or with mixtures of these interpolymerization products with polyvinylchloride by an addition of 0.2 to 0.4 per cent of sodium carbonate and 0.15 to 1.0 per cent of diphenylthiourea.

Example 2

Several portions of polyvinylchloride as employed in Example 1 are washed with aqueous solutions of sodium carbonate and thiourea of varied concentrations so that the following percentages thereof are contained in the polyvinylchloride after drying. The masses are then rolled out into sheets according to Example 1 and tested as to their heat resistance. The results of the tests are set out in the following table:

| Batch | Additions in per cent of— | | Discoloration of the sheets after— | |
|---|---|---|---|---|
| | Sodium carbonate | Thiourea | Rolling at 165° C. for 15 min. | Storage for 2 hours at 155° C. |
| 1 | Less than: 0.03% | 0 | 4-5 | 7 |
| 2 | 0.03% | 0.006 | 4-5 | 7-8 |
| 3 | 0.03% | 0.01 | 4 | 7-8 |
| 4 | 0.03% | 0.03 | 2-3 | 6-7 |
| 5 | 0.03% | 0.15 | 3 | 7 |
| 6 | 0.03% | 1.0 | 3-4 | 8 |
| 7 | 0.08% | 0 | 3 | 6 |
| 8 | 0.08% | 0.006 | 1-2 | 6 |
| 9 | 0.08% | 0.01 | 1 | 5 |
| 10 | 0.08% | 0.03 | ¹1 | 4 |
| 11 | 0.08% | 0.15 | ¹1 | 7 |
| 12 | 0.08% | 1.0 | 1 | 8 |
| 13 | 0.2% | 0.006 | 1-2 | 6 |
| 14 | 0.2% | 0.01 | 1 | 6 |
| 15 | 0.2% | 0.03 | ¹1 | 3 |
| 16 | 0.2% | 0.15 | ¹1 | 6-7 |
| 17 | 0.2% | 1.0 | 1 | 6-7 |
| 18 | 0.4% | 0.006 | 1 | 6 |
| 19 | 0.4% | 0.01 | 1 | 6 |
| 20 | 0.4% | 0.03 | 1 | 2 |
| 21 | 0.4% | 0.15 | ¹1 | 2 |
| 22 | 0.4% | 1.0 | 1-2 | 3 |

¹ Clear.

The comparison of this table with that given in Example 1 shows that thiourea imparts a similar initial stability as about four times its amount of diphenylthiourea, whereas the permanent stability achieved with thiourea is slightly inferior to that of diphenylthiourea.

Example 3

100 parts of polyvinylchloride as employed in Example 1 are made into a paste with a solution of 2.6 parts of a mixture of secondary and tertiary sodium phosphate and 300 parts of water. The paste thus prepared has a pH-value of 11. After removing the liquid by suction the polyvinylchloride is dried, mixed with 1 part of wax and 0.15 part of thiourea in a ball mill and then rolled out into a sheet at 165° C. The sheet remains completely colorless even after rolling for more than 15 minutes, whereas a sheet to which no thiourea was added, has assumed a red-brown color in the same time. A similarly good result is obtained by adding 0.5 part of diphenylthiourea instead of thiourea.

Example 4

100 parts of polyvinylchloride as employed in Example 1 is mixed with 1 part of sodium stearate and 1 part of diphenylthiourea and rolled out into a sheet at 165° C. The sheet obtained is practically colorless and, even after continued heating at 155° C., becomes less brown than an equal sheet without an addition of diphenylthiourea after 15 minutes' rolling.

What I claim is:

1. Polyvinylchloride containing an addition of from 0.1 to 1% of sodium carbonate and from 0.01 to 5% of diphenylthiourea the amount of such diphenyl thiourea being so proportioned with respect to the amount of said sodium carbonate as to render said polyvinylchloride stable in the heat.

2. Compositions as defined in claim 3, wherein the halogen-containing polymer is a polyvinyl chloride.

3. Halogen-containing high-polymeric substances selected from the class consisting of chloro-rubber, chlorinated butadiene rubber, polyvinyl chloride, chlorinated polyvinyl chloride, and polyas-dichlor ethylene; containing an addition of from 0.1 to 1 per cent of sodium carbonate and of from 0.01 to 5 per cent of a member of the group consisting of diphenyl-, dinaphthyl-, ditolyl- and dichlordiphenylthiourea, the amount of such last mentioned compound being so proportioned with respect to the amount of sodium carbonate as to render said high polymeric substance stable in the heat.

HANS FIKENTSCHER.